US007620786B2

(12) United States Patent
El-Batal et al.

(10) Patent No.: US 7,620,786 B2
(45) Date of Patent: Nov. 17, 2009

(54) STORAGE RECOVERY USING A DELTA LOG

(75) Inventors: Mohamad El-Batal, Westminster, CO (US); Bret Weber, Wichita, KS (US); Mark Nossokoff, Fort Collins, CO (US)

(73) Assignee: LSI Corporation, Milpitas, CA (US)

( * ) Notice: Subject to any disclaimer, the term of this patent is extended or adjusted under 35 U.S.C. 154(b) by 291 days.

(21) Appl. No.: 10/660,888

(22) Filed: Sep. 12, 2003

(65) Prior Publication Data

US 2005/0060609 A1 Mar. 17, 2005

(51) Int. Cl.
G06F 13/00 (2006.01)
G06F 11/07 (2006.01)

(52) U.S. Cl. .................. 711/162; 711/161; 711/114; 714/6; 714/7; 714/8

(58) Field of Classification Search .............. 711/161, 711/114, 112, 162
See application file for complete search history.

(56) References Cited

U.S. PATENT DOCUMENTS

| | | | |
|---|---|---|---|
| 5,305,013 A | 4/1994 | Daniels | |
| 5,367,647 A | 11/1994 | Coulson et al. | |
| 5,754,112 A | 5/1998 | Novak | |
| 5,790,374 A | 8/1998 | Wong | |
| 5,864,659 A | 1/1999 | Kini | |
| 5,966,510 A | 10/1999 | Carbonneau et al. | |
| 6,055,653 A | 4/2000 | LeBlanc et al. | |
| 6,088,694 A * | 7/2000 | Burns et al. .................. 707/8 |
| 6,189,016 B1 * | 2/2001 | Cabrera et al. .............. 707/203 |
| 6,282,670 B1 * | 8/2001 | Rezaul Islam et al. ......... 714/6 |
| 6,505,272 B1 | 1/2003 | Bouvier et al. | |
| 6,549,921 B1 * | 4/2003 | Ofek ........................ 707/204 |
| 6,640,280 B1 * | 10/2003 | Kamvysselis et al. ....... 711/113 |
| 6,778,409 B2 | 8/2004 | Jones | |
| 6,785,786 B1 * | 8/2004 | Gold et al. .................. 711/162 |
| 6,907,500 B2 | 6/2005 | Suzuki et al. | |
| 6,952,794 B2 * | 10/2005 | Lu ............................ 714/7 |
| 2002/0016827 A1 * | 2/2002 | McCabe et al. ............. 709/213 |
| 2002/0054477 A1 | 5/2002 | Coffey et al. | |
| 2002/0133736 A1 | 9/2002 | Faber et al. | |
| 2005/0144508 A1 | 6/2005 | McKean et al. | |
| 2005/0149481 A1 * | 7/2005 | Hesselink et al. ............. 707/1 |

* cited by examiner

*Primary Examiner*—Matt Kim
*Assistant Examiner*—Mardochee Chery
(74) *Attorney, Agent, or Firm*—Samuel M. Freund; William W. Cochran; Cochran Freund & Young LLC

(57) ABSTRACT

A system and method for removing one volume of a redundant data storage system, keeping a delta log of subsequent changes to the remaining volumes of the redundant data storage system, replacing the volume, and rebuilding the volume by using the delta log is disclosed. The system and method are applicable to redundant data storage systems such as RAID systems and mirrored backup systems including remote mirrored systems.

24 Claims, 3 Drawing Sheets

STORAGE RECOVERY USING A DELTA LOG

CROSS REFERENCE TO RELATED APPLICATIONS

This application is simultaneously filed with U.S. patent application Ser. No. 10/660887 entitled "Disk Storage System with Removable Arrays of Disk Drives", by Mohamad El-Batal, et al and U.S. patent application Ser. No. 10/660889 entitled "Data Storage System with a Removable Backplane Having an Array of Disk Drives", by Mohamad El-Batal, et al, the entire contents of which are hereby specifically incorporated by reference for all they disclose and teach.

BACKGROUND OF THE INVENTION a. Field of the Invention

The present invention pertains generally to redundant data storage systems and more specifically to the restoration of replaced or repaired storage units in redundant data storage system.

b. Description of the Background

Several types of redundant data storage systems are in use today. RAID systems, which use several independent disk drives, may be configured in several different manners so that if one of the disk drives fails, the data is not lost. Such systems have been developed because of the often catastrophic and unannounced failures of disk drives.

Other types of redundant data storage systems have been developed. In one solution, remote mirroring systems may maintain two identical data storage systems at remote locations. In such a system, one data storage system may be located in one location and an identical copy, or mirror, may be located in a different location, such as another building, state, or country.

Redundant systems of the type described above often allow for a single disk to be removed and replaced. Sometimes, such replacement may be performed 'hot' or when the system is otherwise up and running. When the disk is replaced, various methodologies may be used to restore the data onto the new disk. In the example of a RAID 1, or mirrored disk system, when one disk is replaced, the data is copied from the good disk to the newly replaced disk. In an example of RAID 5, the data on the replaced disk is recovered by recreating the data from the stored parity.

Recovering or rebuilding a lost disk drive or other data storage subsystem becomes problematic as the size of the disk drive or data storage subsystem increases. As the disk drive becomes large, the amount of time required for rebuilding likewise increases. During the rebuilding process, the data storage system is most vulnerable to an additional failure, since the redundancy may not exist until the rebuilding process is complete. Further, the controller and disk drives tend to be busy with the rebuilding process which causes the system response time to read and write requests to become a problem.

It would therefore be advantageous to provide a system and method for quickly rebuilding a replaced or serviced data storage unit in a redundant data storage system. It would be further advantageous if such a system minimized the amount of time that the system would be vulnerable to additional problems and be operating at a reduced performance.

SUMMARY OF THE INVENTION

The present invention overcomes the disadvantages and limitations of previous solutions by providing a system and method for removing one volume of a redundant data storage system, keeping a delta log of subsequent changes to the remaining volumes of the redundant data storage system, replacing the volume, and rebuilding the volume by using the delta log. The system and method are applicable to redundant data storage systems such as RAID systems and mirrored backup systems including remote mirrored systems.

An embodiment of the present invention may therefore comprise a method for recovering data in a redundant data storage system having a plurality of data storage units, the method comprising: storing the data on the plurality of data storage units according to a redundant data storage method; removing one of the plurality of data storage units; while the one of the plurality of data storage units is removed, changing a portion of the data on the remainder of the plurality of data storage units and storing a record of the changes in a delta file; replacing the one of the plurality of data storage units; and updating the one of the plurality of data storage units by updating those portions of data recorded in the delta file.

Another embodiment of the present invention may comprise a redundant data storage system capable of fast restoration of serviced data storage units comprising: a plurality of data storage units; and a controller that stores data on the plurality of data storage units according to a redundant data storage method, changes a portion of the data after taking one of the plurality of the data storage units off line, stores a record of the changes in a delta log that are made to the remainder of the plurality of the data storage units, brings the one of the plurality of the data storage units online, and updates the one of the plurality of the data storage units by updating those portions of data recorded in the delta file.

Yet another embodiment of the present invention may comprise a redundant data storage system capable of fast restoration comprising: a first means for storing data; a second means that stores data on the first means according to a redundant data storage method, changes a portion of the data after taking one of the first means off line, stores a record of the changes in a third means that are made to the remainder of the plurality of the first means, brings the one of the first means online, and updates the one of the first means by updating those portions of data recorded in the third means.

The advantages of the present invention are that periodic servicing or interruptions in service for an individual data storage unit do not require a full rebuilding of all the data on the individual data storage unit. Thus, service may be performed on an individual data storage unit without requiring a lengthy rebuild and the subsequent diminished system response time during the rebuild process.

DETAILED DESCRIPTION OF THE INVENTION

Figure 1:
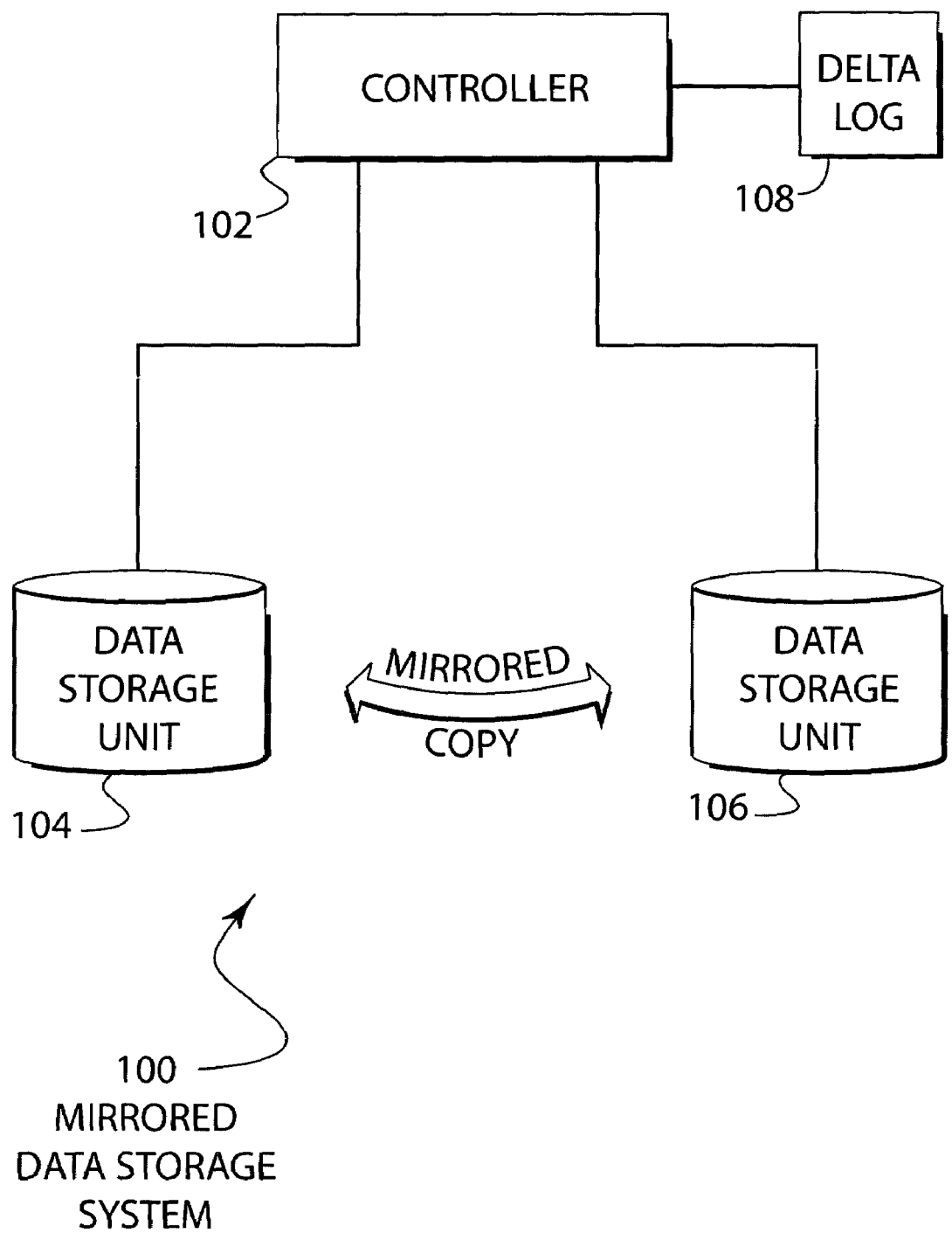
FIG. 1 is an illustration of an embodiment of the present invention showing a mirrored data storage system.

FIG. 1 illustrates an embodiment 100 of the present invention showing a mirrored data storage system. A controller 102 is controlling data storage units 104 and 106. The controller 102 has a delta log 108 that may be used when one of the data storage units 104 or 106 is taken offline.

The embodiment 100 may be a RAID 1 data storage system wherein the controller 102 controls a mirrored set of disk drives. In such an embodiment, the data storage units 104 and 106 may be single disk drives.

The embodiment 100 may be a remote mirrored data storage system. In such an embodiment, one or more of the controller 102 and the data storage units 104 and 106 may be located remotely. For example, the controller 102 and data storage unit 104 may be located at a company headquarters while data storage unit 106 may be located in a separate, secure location, such as in another town, county, state, or country. In such an embodiment, the data storage units 104 and 106 may be any type of data storage system. Such data storage systems may be standalone data storage servers, amalgamations of disk drives in a RAID or other data storage system format, individual disk drives, or any other system by which data may be stored.

When one of the data storage units 104 or 106 becomes unavailable, a delta log 108 may be kept. The delta log 108 may keep track of any changes made to the data during the temporary outage of one of the data storage units 104 or 106. When the data storage unit become available again, only the changed data as recorded in the delta log 108, may need to be updated in the restarted data storage unit.

The controller 102 may send data read and write requests to both of the data storage units 104 and 106 substantially simultaneously. In so doing, the data is constantly maintained in both locations. For some reason, the controller 102 may bring one of the data storage units off line. For example, a technician may perform periodic maintenance to a data storage unit. Other reasons for bringing a data storage unit off line may be power, electrical, software, mechanical failure, or any other type of unexpected downtime.

On detection of a problem with one of the data storage units 104 or 106, the controller 102 may quickly take the suspect problem unit off line and continue servicing read and write requests with the remaining data storage unit. During this downtime, the data reads and writes are sometimes called "dirty", which refers to the fact that the backup system is not available to protect the new data. The dirty data may be captured in the delta log 108.

The delta log 108 may be configured in a number of different manners. For example, the delta log 108 may comprise pointers to the starting and stopping addresses of any changed data. In other embodiments, the delta log 108 may include all of the read and write requests in their entirety. Those skilled in the arts may construct the delta log 108 in any manner sufficient so that the dirty data may be updated on the restarted data storage unit.

When one of the data storage units 104 or 106 is replaced with a new data storage unit, the controller 102 may rebuild the replaced drive by copying all of the information from the known good data storage unit to the replaced one. Such copying can be very time consuming when the data storage units are very large, but necessary when the replaced data storage unit contains no data. Such processes may cause the overall response time of the system to suffer during the period of rebuilding the new data storage unit.

When a data storage device 104 or 106 is taken off line without losing any data, it may be brought back online and the delta log 108 may indicate those data that need updating. In this manner, the data storage unit may be quickly updated and returned to service without a lengthy rebuild process.

The delta log 108 may be a file or data storage area that is allocated on the data storage units after it is determined that the delta log 108 is necessary. In some embodiments, the delta log 108 may be stored on a data storage device that is separate from the data storage units 104 or 106. For example, the controller 102 may have a local data storage system, such as NVRAM, FLASH, a disk drive, or other storage device, that may be used for the temporary storage of the delta log 108. In an embodiment with redundant storage controllers, the delta log may be stored on a local non-volatile media on both redundant storage controllers, or on a reserved configuration area of the storage devices within storage subsystem. The location and storage system used to store the delta log 108 may be any storage area to which the controller 102 has communication. Those skilled in the arts will appreciate that various storage media and locations of the storage media may be used to store the delta log 108 while keeping within the spirit and intent of the present invention.

Figure 2:
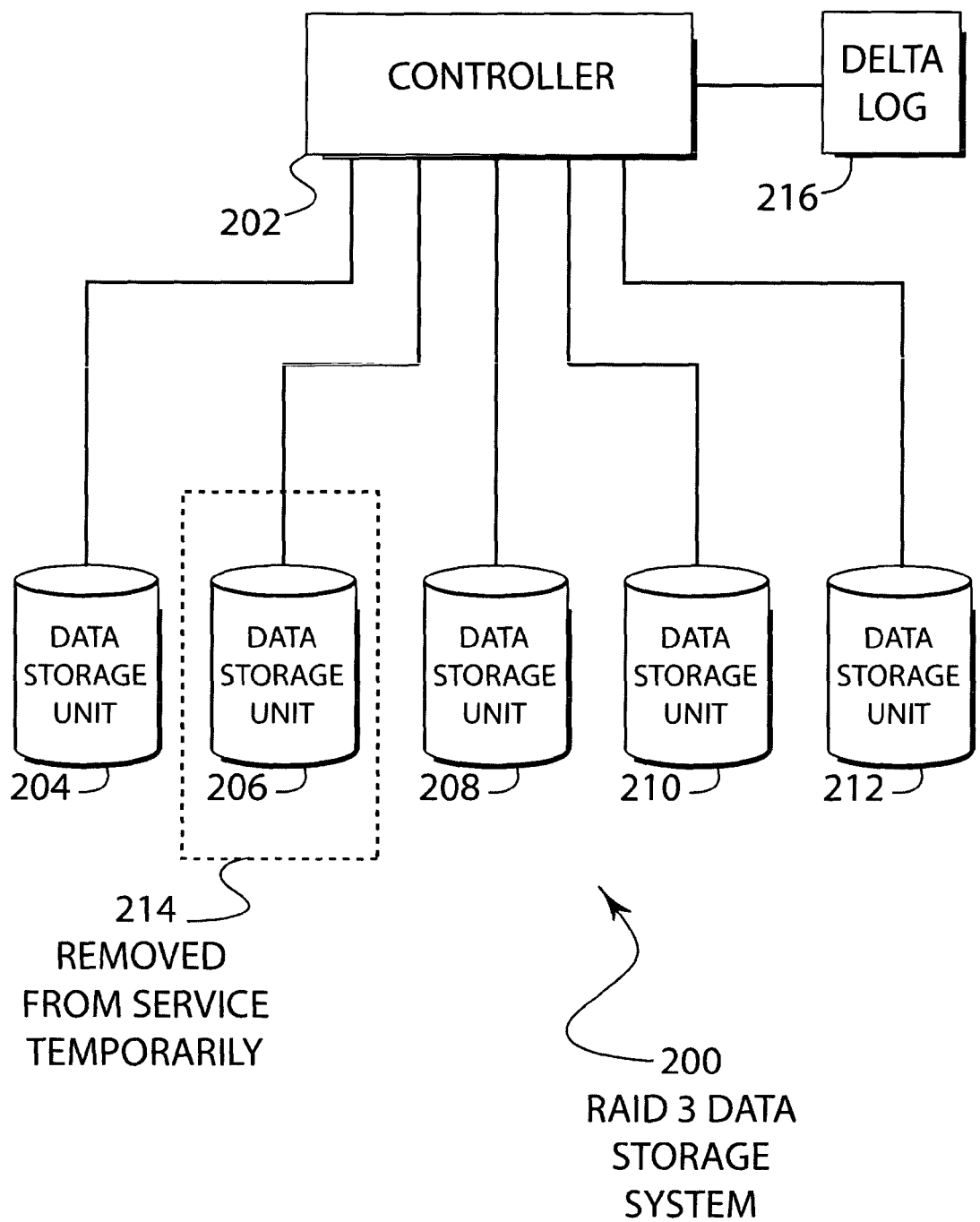
FIG. 2 is an illustration of an embodiment of the present invention showing a RAID 3 data storage system.

FIG. 2 illustrates an embodiment 200 of the present invention showing a RAID 3 data storage system. A controller 202 controls the data flow to and from data storage units 204, 206, 208, and 210. Data storage unit 212 contains the parity as defined as the bit-by-bit XOR of the data stored in the data storage units 204, 206, 208, and 210. When one of the data storage units is removed from service temporarily, such as data storage unit 206 being removed from service shown as dashed line 214, a delta log 216 may be used to store any changed data that effects the removed data storage unit 214.

The embodiment 200 illustrates how a delta log 216 may be used with a RAID 3 data storage system. In the present embodiment, a RAID 3 storage system may have data storage units 204, 206, 208, and 210 storing data while data storage unit 212 contains the parity. In a RAID 3 embodiment, when one of the data storage units 204, 206, 208, 210, or 212 becomes unavailable and a read request is received by the controller 202, the controller 202 may 'create' any missing data by performing an XOR operation on the remaining available data. Likewise, when a write request is received by the controller 202, the data may be written to four of the five data storage units without compromising the ability to later read the data.

The data storage units 204, 206, 208, 210, and 212 may be individual disk drives or may be other data storage devices. In some embodiments, each data storage unit 204, 206, 208, 210, and 212 may be a small array of disk drives or other data storage devices. For example, a single data storage device 204, 206, 208, 210, or 212 may be an array of two or more disk drives. In some embodiments, a data storage device may comprise thirty or more individual disk drives. Each array of disk drives may have its own controller. In still other embodiments, the data storage units 204, 206, 208, 210, and 212 may be remotely located.

When the data storage unit 206 becomes unavailable, the controller 202 may begin to perform read and write operations on the remaining data storage units and also keep a record of all changes to the data in the delta log 216. When the data storage unit 208 is returned to service, the controller 202 may rebuild the data on data storage unit 206 by either completely rebuilding the data from all of the other data storage units 204, 208, 210, and 212 or by only changing the data as recorded in the delta log 216.

For data storage units that are temporarily removed from service, most of the data still contained on that data storage unit is good data. The data that is out of date may be known by the delta log 216. Thus, the controller 202 may rebuild only the necessary portion of the data storage unit that is known out of date data. For data storage units that are removed and replaced with an empty data storage unit, the controller 202 may have to rebuild all of the data on the replaced data storage unit.

Those skilled in the art will appreciate that various embodiments may include any type of data storage system that uses a plurality of data storage volumes in a fashion wherein one of the volumes may be removed from service while maintaining data integrity. Such embodiments may include different RAID levels, including RAID 5, RAID 53, local and remote mirrored embodiments, and any other redundant, multi-volume data storage scheme.

Figure 3:
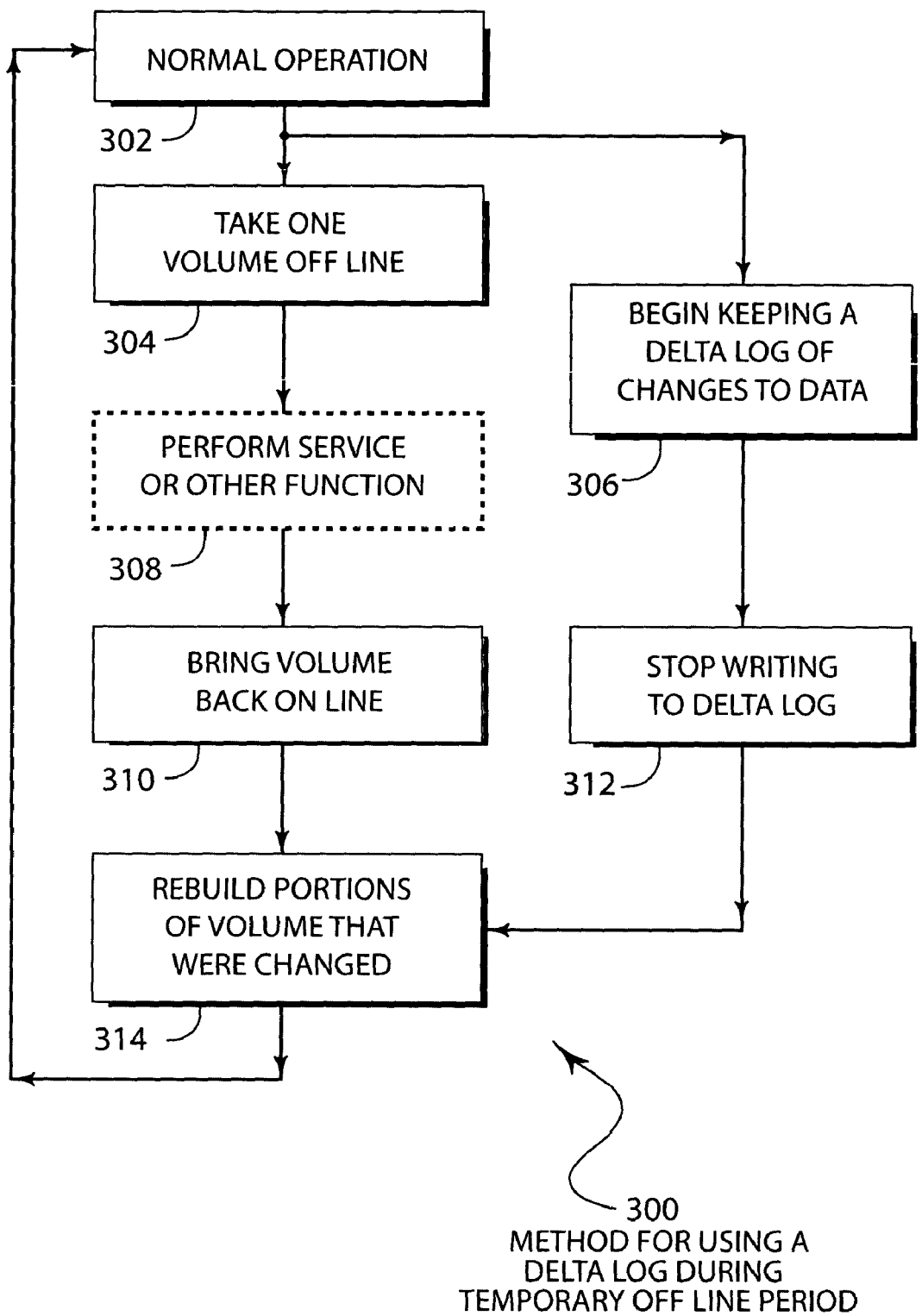
FIG. 3 is an illustration of an embodiment of the present invention showing a method for using a delta log during temporary off line period of one of the data storage units in a redundant data storage system.

FIG. 3 illustrates an embodiment 300 of the present invention showing a method for using a delta log during temporary off line period of one of the data storage units in a redundant data storage system. The normal operational state of the system begins in block 302. When one of the data storage volumes is taken offline in block 304, simultaneously, a delta log is kept for all changes to the data in block 306. Service or other function is performed on the data storage volume in block 308. When the data storage volume is brought online in block 310, the writing to the delta log is stopped in block 312. The portions of data that were out of date are rebuilt using the delta log in block 314.

The embodiment 300 may be used with data storage volumes that are temporarily off line. The off line action may include operator initiated actions, such as service, or may be unscheduled actions such as power failure or other action. During the period of offline activity, the data storage volume may retain all of the existing data. Thus, when the data storage volume is returned to service in block 310, only the changed data would require updating.

The embodiments illustrate how a data storage volume in any type of redundant storage system may be simply and quickly rebuilt and returned to full service when the data on the data storage volume is unchanged during the out of service period. By storing a delta log of the changes made during the unavailable period, the out-of-service volume may be quickly brought back to a full operating state without the lengthy and cumbersome process of rebuilding all of the data.

Various embodiments may be contemplated by those skilled in the arts. Such embodiments may use mirroring techniques, parity techniques, or other technique whereby one or more volumes may be taken off line while the entire data storage system maintains data availability. Various RAID levels and other techniques may be used by those skilled in the art while keeping within the spirit and intent of the present invention.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for recovering data in a redundant data storage system having a plurality of data storage units, said method comprising:

storing said data on said plurality of data storage units according to a redundant data storage method;

removing one of said plurality of data storage units for a period;

starting a delta log separate from said plurality of data storage units concurrent with said step of removing one of said plurality of data storage units;

changing a portion of said data on the remainder of said plurality of data storage units during the period when one of said plurality of data storage units is removed in accordance with the redundant data storage method;

storing a record of said changes in said delta log during the period when one of said plurality of data storage units is removed;

replacing said one of said plurality of data storage units; and updating said one of said plurality of data storage units by updating those portions of data recorded in said delta log.

2. The method of claim 1 wherein said redundant data storage method comprises RAID 1.

3. The method of claim 1 wherein said redundant data storage method comprises RAID 3.

4. The method of claim 1 wherein said redundant data storage method comprises RAID 5.

5. The method of claim 1 wherein said redundant data storage method comprises remotely mirroring said data.

6. The method of claim 1 wherein said one of said data storage units comprises a plurality of disk drives.

7. The method of claim 1 wherein said delta file comprises pointers to said portion of said data that is changed.

8. The method of claim 1 wherein said delta file comprises an updated version of said portion of said data that is changed.

9. A redundant data storage system capable of fast restoration of serviced data storage units comprising:

a plurality of data storage units;

a delta log separate from said plurality of data storage units; and a controller that stores data on said plurality of data storage units according to a redundant data storage method, changes a portion of said data after taking one of said plurality of said data storage units off line for a period, stores a record of the changes in said delta log that are made to the remainder of the plurality of said data storage units during the period when one of said plurality of said data storage units is off line, brings said one of said plurality of said data storage units online, and updates said one of said plurality of said data storage units by updating those portions of data recorded in said delta file.

10. The redundant data storage system of claim 9 wherein said redundant data storage method comprises RAID 1.

11. The redundant data storage system of claim 9 wherein said redundant data storage method comprises RAID 3.

12. The redundant data storage system of claim 9 wherein said redundant data storage method comprises RAID 5.

13. The redundant data storage system of claim 9 wherein said redundant data storage method comprises remote mirroring.

14. The redundant data storage system of claim 9 wherein said one of said data storage units comprises a plurality of disk drives.

15. The redundant data storage system of claim 9 wherein said delta file comprises pointers to said portion of said data that is changed.

16. The redundant data storage system of claim 9 wherein said delta file comprises an updated version of said portion of said data that is changed.

17. A redundant data storage system capable of fast restoration comprising:

a first means for storing data;

a second means that stores data on said first means according to a redundant data storage method, changes a portion of said data after taking one of said first means off line for a period, stores a record of the changes in a third means separate from said first means that are made to the remainder of the plurality of said first means during the period when one of said first means is off line, brings said one of said first means online, and updates said one of said first means by updating those portions of data recorded in said third means.

18. The redundant data storage system of claim 17 wherein said redundant data storage method comprises RAID 1.

19. The redundant data storage system of claim 17 wherein said redundant data storage method comprises RAID 3.

20. The redundant data storage system of claim 17 wherein said redundant data storage method comprises RAID 5.

21. The redundant data storage system of claim 17 wherein said redundant data storage method comprises remote mirroring.

22. The redundant data storage system of claim 17 wherein said one of said first means comprises a plurality of disk drives.

23. The redundant data storage system of claim 17 wherein said third means comprises pointers to said portion of said data that is changed.

24. The redundant data storage system of claim 17 wherein said third means comprises an updated version of said portion of said data that is changed.

* * * * *